(12) United States Patent
Angerfors

(10) Patent No.: US 6,375,281 B1
(45) Date of Patent: Apr. 23, 2002

(54) BRAKE TORQUE REGULATION FOR VEHICLES

(75) Inventor: Dan Angerfors, Floda (SE)

(73) Assignee: Volvo Lastvagnar AB (SE)

( * ) Notice: Subject to any disclaimer, the term of this patent is extended or adjusted under 35 U.S.C. 154(b) by 0 days.

(21) Appl. No.: 09/530,285

(22) PCT Filed: Nov. 3, 1998

(86) PCT No.: PCT/SE98/01986

§ 371 Date: Apr. 27, 2000

§ 102(e) Date: Apr. 27, 2000

(87) PCT Pub. No.: WO99/24299

PCT Pub. Date: May 20, 1999

(30) Foreign Application Priority Data

Nov. 7, 1997 (SE) ............................................ 9704070

(51) Int. Cl.$^7$ .................................................. B60T 8/74
(52) U.S. Cl. ............................. 303/176; 303/7; 303/59; 303/122
(58) Field of Search ................... 303/3, 7, 15, 20, 303/59, 60, 9.62, 9.66, 155, 166, 189, 112, 176, 122.03, 122.05, 122.1

(56) References Cited

U.S. PATENT DOCUMENTS

| | | | | |
|---|---|---|---|---|
| 4,324,320 A | * | 4/1982 | Spurlin et al. | 188/271 |
| 4,327,414 A | * | 4/1982 | Klein | 364/426 |
| 4,768,840 A | * | 9/1988 | Sullivan et al. | 303/6.01 |
| 4,907,842 A | * | 3/1990 | Goldfein | 303/13 |
| 5,116,107 A | * | 5/1992 | Hull et al. | 303/7 |
| 5,415,466 A | * | 5/1995 | Breen et al. | 303/7 |
| 6,079,791 A | * | 6/2000 | Stumpe et al. | 303/7 |
| 6,189,986 B1 | * | 2/2001 | Shimizu et al. | 303/155 |

FOREIGN PATENT DOCUMENTS

| | | | |
|---|---|---|---|
| DE | 1937187 | * | 3/1977 |
| EP | 0 488 405 A1 | | 6/1992 |
| FR | 2 242 267 A1 | | 3/1975 |
| JP | 410136300 A | * | 9/1998 |
| WO | 89/08572 | | 9/1989 |
| WO | 91/09758 | | 4/1991 |
| WO | 92/05985 | | 4/1992 |

\* cited by examiner

*Primary Examiner*—Christopher P. Schwartz
*Assistant Examiner*—Xuam Lan Nguyen
(74) *Attorney, Agent, or Firm*—Lerner, David, Littenberg, Krumholz & Mentlik, LLP

(57) ABSTRACT

Methods are disclosed for regulating the braking torque generated by the braking system of a vehicle which include a friction lining, a brake surface, an actuator for displacing the friction lining by means of a medium towards he brake surface with a predetermined brake pressure in order to generate the brake torque, the method including restricting the predetermined brake pressure below a maximum brake pressure for the speed of the vehicle only when the actuator is actuated when the vehicle is traveling at a speed below a predetermined speed. Apparatus is also disclosed for carrying out the method.

15 Claims, 3 Drawing Sheets

BRAKE TORQUE REGULATION FOR VEHICLES

TECHNICAL FIELD

The present invention relates to a method for regulating braking torque generated by a braking system in a wheeled vehicle according to the preamble of claim 1, and to an arrangement for regulating braking torque generated by a braking system in a wheeled vehicle according to the preamble of claim 11. The invention further relates to the use of pressure regulating means in a braking system of a wheeled vehicle to restrict brake torque generated by said braking system.

The invention is primarily intended for, but not restricted solely to, applications in braking systems of commercial vehicles such as trucks and lorries.

BACKGROUND OF THE INVENTION

Electronic control is being employed to an ever increasing extent in vehicles to ensure optimal efficiency and reliability of various operational systems. A recent development in the truck industry is the availability of electronic braking systems (EBS). Although compressed air is still used to apply the brakes in EBS, electronics are used to command pressure-regulating modules to pressure the brake cylinders with compressed air to thereby engage the brakes. At least theoretically, by being able to monitor various forces, load changes and individual braking rates, EBS can continuously modify the braking on each wheel to thereby provide optimal distribution of the braking force. Anti-lock braking (ABS) and traction-control (ASR) functions can also be integrated in the EBS.

As is described in WO 91/09758, EBS can be employed to adapt the brake pressure supplied to the brakes of a trailer to that supplied to the brakes of the hauling truck.

Irrespective of whether a truck is fitted with EBS, during an emergency stop the brake torque generated by the brakes rapidly rises to a short duration peak value before leveling off to a lower value. This effect is illustrated in FIG. 1 for a drum brake system in which brake torque is plotted as a function of time for emergency braking from three different speeds. Thus, curve A represents emergency braking from 20 km/h, curve B from 60 km/h and curve C from 100 km/h. It is apparent that the maximum value of peak brake torque arises when emergency braking from relatively low speed.

The use of disc brakes on commercial vehicles is becoming more widespread. Generally, disc brakes are lighter than corresponding drum brakes, thereby contributing to reduced unsprung weight. Furthermore, they have the ability to dissipate heat more effectively than drum brakes, which implies that they are often less prone to brake fade from high speeds. In order to slow down a heavily laden truck from high speeds, the disc brake actuators must be capable of exerting high pressure on the brake pads. As is apparent from FIG. 2, this high braking pressure results in even greater peak values for the brake torque than those attained with a drum brake system when emergency braking from corresponding speeds.

The high peak values of brake torque when emergency braking from low speed, and as represented by curve D in FIG. 2, create significant problems for the truck manufacturer. Firstly, the vehicle suspension components and axles, particularly at the front of the vehicle, must be dimensioned to be able to withstand these peak braking torques. This implies a substantial increase in weight and manufacturing costs. Secondly, the peak braking torque may be sufficient to activate the ABS system even if the truck is travelling on a high-friction surface such as dry asphalt. On such surfaces and at speeds below say 25 km/h, a shorter braking distance is in fact attained if the ABS does not cut in. Thirdly, the severe jolt which is transmitted through the truck upon emergency application of the brakes at low speeds implies that the cargo has to be more securely tied down than would be the case if such peak brake torques did not arise. This means of course that extra time and expense is involved in equipping the truck with adequate cargo-retaining means.

SUMMARY OF THE INVENTION

It is therefore an object of the present invention to provide a method and an arrangement for overcoming the problems associated with peak brake torque arising during emergency braking from low speeds.

This object is achieved by the method according to claim 1 and by the arrangement according to claim 11.

Preferred embodiments of the method and arrangement are detailed in the respective dependent claims.

The invention further provides for the use of pressure regulating means in a braking system of a wheeled vehicle to restrict brake torque generated by said braking system to a predetermined value below a maximum value when said vehicle is travelling below a predetermined speed when said braking system is initially actuated.

In accordance with the invention, when emergency braking from a speed below a predetermined value, braking pressure is restricted to a predetermined value which lies below the maximum value of pressure which is otherwise attainable above the predetermined value of speed. In this manner, the peak brake torque value when emergency braking from low speeds will be relatively lower without compromising desirable high braking pressure when emergency braking from higher speeds. This implies that even more effective brakes can be fitted to a vehicle without having to strengthen existing suspension components and mountings.

BRIEF DESCRIPTION OF THE DRAWINGS

Further objects and advantages of the present invention will become apparent from the subsequent detailed description of preferred embodiments in which reference is made to the attached drawings, of which.

DETAILED DESCRIPTION OF PREFERRED EMBODIMENTS

Figure 1:
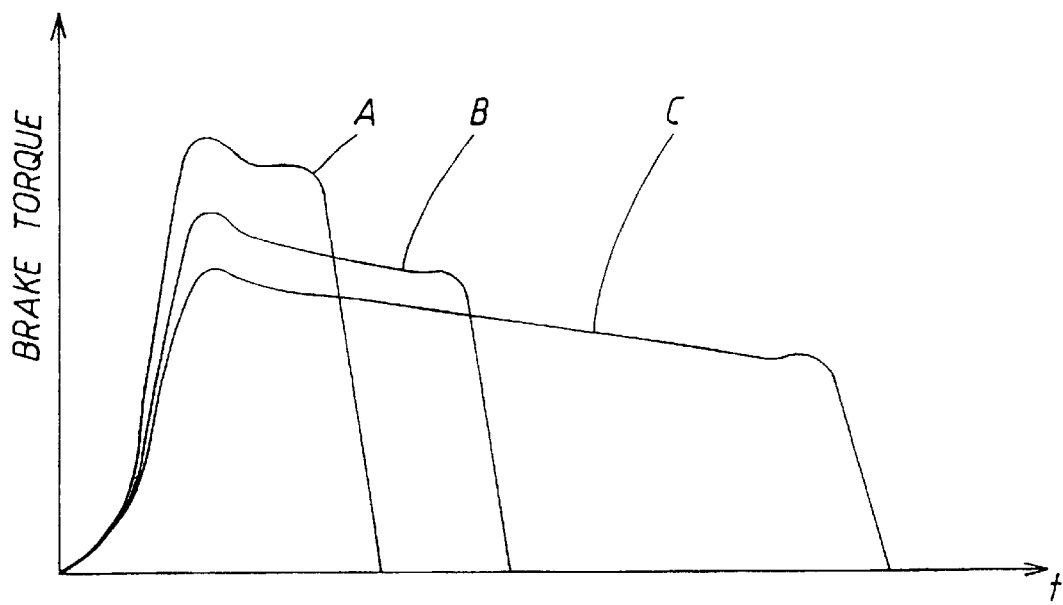
FIG. 1 shows the relationship between brake torque and time for a vehicle fitted with a conventional drum brake system being emergency braked from various speeds.

As previously mentioned, FIG. 1 is a graph of brake torque against time for emergency braking from three different speeds for a typical drum brake system fitted to a commercial vehicle. By the expression "emergency braking" it is hereby meant that the driver of the vehicle attempts to reduce the speed of the vehicle as quickly as possible.

Curve A represents emergency braking from 20 km/h, curve B from 60 km/h and curve C from 100 km/h. In all cases, when the brakes are initially applied, a peak braking torque is attained for a short duration. This peak is most noticeable when emergency braking from low speed.

Figure 2:
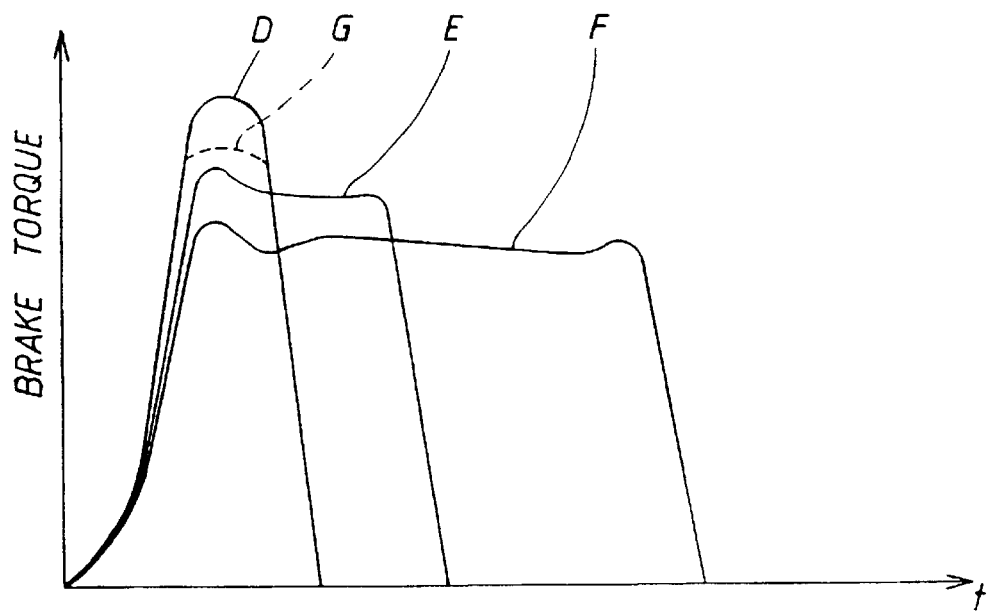
FIG. 2 corresponds to FIG. 1, though for a vehicle fitted with a conventional disc brake system.

In a similar manner, FIG. 2 shows corresponding curves D, E and F for a commercial vehicle fitted with a disc brake system. As clearly illustrated by curve D, the peak value of the braking torque when emergency braking from low speed is significantly increased when compared to both braking from higher speeds and the peak torque which is attained with the drum brake system.

The curve G illustrated by a dashed line in FIG. 2 represents a limited peak brake torque value which is attainable in accordance with the method and arrangement of the present invention. It is to be noted that the reduction of the peak brake torque value affects only the braking curve from low speed. The brake torque values are not affected for emergency braking from higher speeds. Nevertheless, due to the inherent flexibility of the present system achieved thanks to its compatibility with EBS, the manufacturer and/or workshop can easily reprogram the system so that peak brake torque can be restricted during emergency braking from above any chosen speed.

Figure 3:
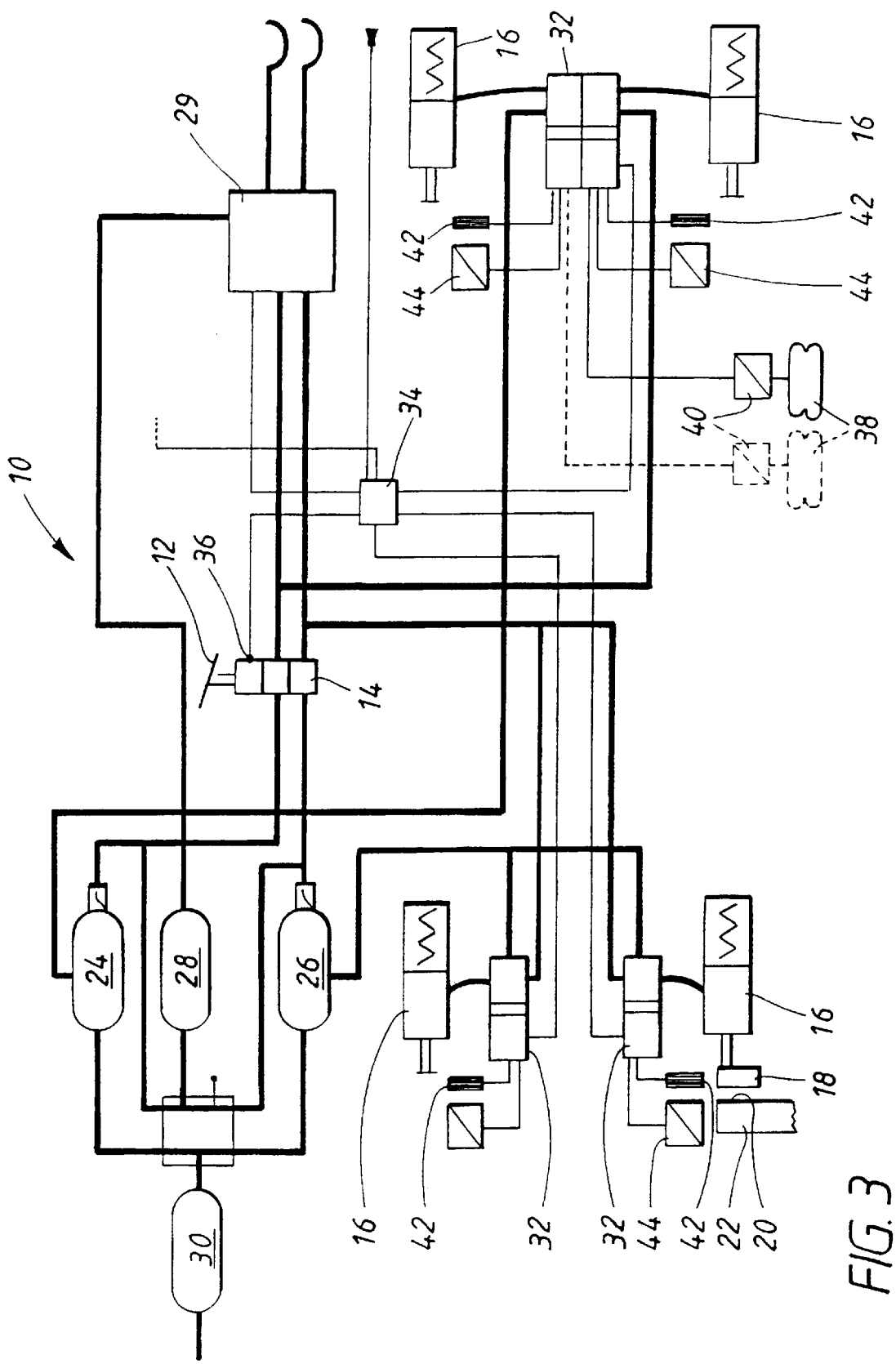
FIG. 3 is a schematic representation of a vehicle brake system provided with an arrangement according to the present invention.

FIG. 3 schematically illustrates a braking system, generally denoted by reference numeral 10, of the EBS type incorporating the arrangement according to the present invention which permits generation of the curve G of FIG. 2. The preferred embodiment of FIG. 3 is a compressed air braking system, with compressed air conduits being depicted by thicker lines and electrical leads being depicted by thinner lines. It is to be understood, however, that the invention can be practised on a braking system having an operating medium other than compressed air, for example a hydraulic system.

The system 10 of FIG. 3 comprises a brake pedal 12 connected to a brake valve 14. In a manner which will be explained in the following, depression of the brake pedal 12 causes an actuator 16 associated with each wheel of the vehicle (four in the shown embodiment) to effect displacement of a friction lining 18 towards a brake surface 20 on, in the present case, a brake disc 22.

Compressed air for the braking system 10 is stored in rechargeable reservoirs 24, 26, 28. One reservoir 24 supplies compressed air to the rear brakes of the vehicle, whilst another reservoir 26 supplies compressed air to the front brakes. In a typical brake system, the pressure of the compressed air in the reservoirs 24, 26 is between 8.2 and 12 bar. Should the pressured drop below 8.2 bar, a compressor (not shown) cuts in to recharge the reservoirs. The third reservoir 28 supplies compressed air at a pressure of between 8.2 and 8.5 bar to a parking brake. The three reservoirs also supply compressed air to a trailer modulator valve 29 to which air lines to a trailer (not shown) may be connected to thereby permit braking of the trailer. A drainage tank 30 may be included in the braking system for the collection of water from the compressed air.

The respective reservoirs 24 and 26 supply compressed air to a pressure modulator 32 associated with each wheel. In the shown embodiment, the rear wheels are served by a tandem pressure modulator. In a manner which will be described in the following, each pressure modulator 32 is controlled by signals sent from a central electronic processing unit (CPU) 34 to thereby regulate the supply of compressed air to its respective actuator 16.

The CPU receives signals from a number of sensors and, dependent on the information content of such signals, instructs each pressure modulator 32 to supply a particular pressure of compressed air to its respective actuator 16. Accordingly, the brake valve 14 is provided with a sensor 36 to detect displacement of the brake pedal 12 which is an indication of the degree of braking effort which is desired by the driver. In the shown embodiment, the vehicle is provided with rear air suspension 38. Thus, pressure sensors 40 relay information to the CPU 34 so that an indication of the load on the rear suspension can be obtained. The system further includes at each wheel a wheel speed sensor 42 and a friction lining wear sensor 44. The information relayed by these sensors is used i.a. to modulate the ABS function of the braking system.

By taking into account e.g. the rear axle load, the speed of rotation of each wheel, the degree of wear of each friction lining and the degree of braking effort which is desired by the driver, the CPU can apportion pressure between the actuators 16 so that the most advantageous braking effect is attained.

In accordance with the present invention, the CPU is provided with means in the form of a comparator for comparing the speed at which the vehicle is travelling when, in the event of an emergency braking, the brake pedal 12 is initially depressed to a predetermined speed value stored in a memory of the CPU. If the comparator determines that the vehicle speed is less than the predetermined speed value, the CPU signals the pressure modulators 32 to restrict the pressure to the actuators 16 to a first predetermined value of pressure which is below the normal maximum value. Since the pressure to the actuators is restricted, the braking pressure with which the friction linings 18 act on the brake surfaces 20 will be correspondingly lower than the otherwise attainable maximum value. As a consequence, the peak braking torque will be lower than that which would otherwise have been attained if the CPU had not instructed the pressure modulators 32 to restrict the pressure.

Conversely, should the comparator determine that the vehicle speed is higher than the predetermined speed value stored in the CPU, the CPU will permit the pressure modulators 32 to allow maximum pressure to be transmitted to the actuators 16. Thus, above the predetermined speed value, the actuators 16 are able to cause the friction linings 18 to exert a maximum braking pressure on the braking surfaces 20.

With reference to FIG. 2, if the predetermined speed value stored in the CPU is chosen to be, say, 40 km/h, emergency braking from 20 km/h will generate a brake torque/time curve corresponding to curve G. In other words, the peak brake torque will be significantly lower than if the CPU had not caused the pressure modulators to restrict the pressure to the first predetermined value of pressure. In the event of emergency braking from 60 km/h and 100 km/h, curves corresponding to curves E and F respectively will be obtained.

The actual value of the predetermined speed value is not critical. Preferably, it should be below about 60 km/h so that braking performance above this speed is not compromised. Advantageously, the predetermined speed value can be below about 50 km/h and most preferably at about 40 km/h.

Similarly, the actual degree of restriction of the pressure of the compressed air acting on the actuators is not critical. Nevertheless, it is advantageous if the maximum attainable pressure is at least 10% greater, preferably at least 20% greater, than the first predetermined value of pressure.

In a preferred embodiment of the invention, a second predetermined speed value is stored in the CPU, the second predetermined speed value being at least 10% higher than the first predetermined speed value. Thus, the pressure of the compressed air acting on the actuators is limited to a first predetermined value of pressure in the event of emergency braking when the vehicle is travelling at a speed below the first predetermined speed value and is permitted to be a maximum value when the vehicle is subjected to emergency braking from a speed above the second predetermined speed value. Should the vehicle be travelling at a speed between the first predetermined speed value and the second predetermined speed value when emergency braking is instigated, the pressure modulators 32 are instructed to provide pressure to the actuators 16 at a pressure value which lies between the first predetermined value of pressure and the maximum pressure. This situation is illustrated in FIG. 4 in which the first predetermined speed value is denoted by $v_1$ and the second predetermined speed value by $v_2$.

In a preferred embodiment of the invention, the second predetermined speed value $v_2$ is between 30% and 60% higher than the first predetermined speed value $v_1$. Advantageously, the first predetermined value of speed $v_1$ lies between about 10 km/h and 40 km/h and the second predetermined value of speed $v_2$ lies between about 20 km/h and about 60 km/h. The first predetermined value of pressure $P_1$ may typically be about 7.5 bar and the maximum pressure $P_m$ about 9 bar+/−0.5 bar. In the event of a fault in the arrangement according to the invention, and to prevent possible damage being inflicted on the vehicle due to excessively high peak brake torques, the brake system may be designed to operate at the first predetermined value of pressure throughout the entire speed range of the vehicle. Naturally, the vehicle driver can be informed of the fault via a warning signal in the vehicle cab. It is to be appreciated that the vehicle is capable of meeting legislated braking distances even if the brake system is operated at the first predetermined value of pressure throughout the entire speed range of the vehicle.

Figure 4:
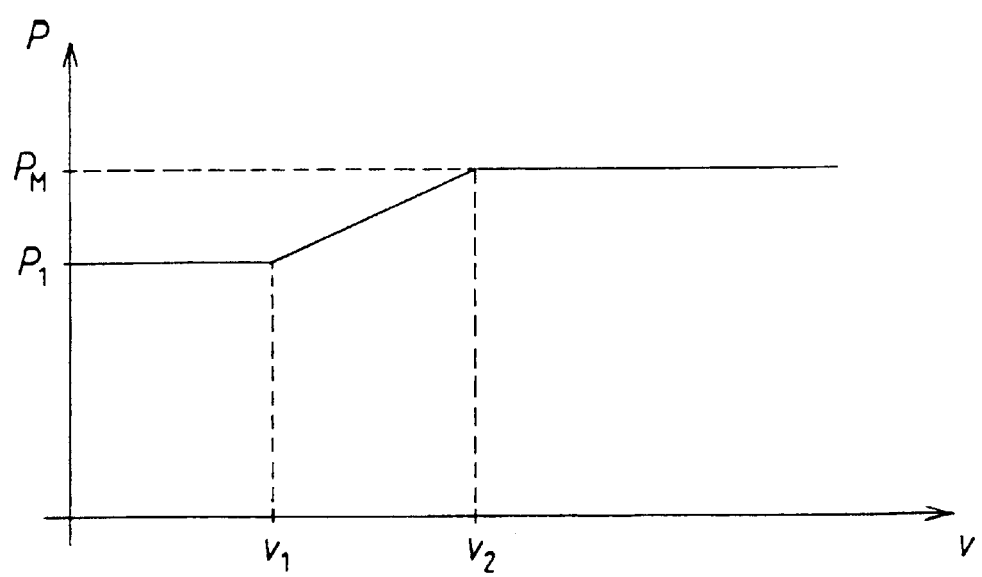
FIG. 4 shows the relationship between pressure and speed in a brake system operated according to a preferred embodiment of the present invention.

It will be apparent from FIG. 4 that the value of pressure between the first predetermined value of pressure $P_1$ and maximum pressure $P_m$ varies in a substantially linear manner. It is to be understood, however, that the invention may also make use of a non-linear pressure variation between $P_1$ and $P_m$.

The invention is not restricted to the embodiments described above and shown in the drawings, but may be varied within the scope of the appended claims. For example, The second predetermined speed value may correspond to the maximum speed of the vehicle such that the pressure value acting on the actuators increases gradually from the first predetermined value of pressure below the first predetermined speed value to maximum pressure at the maximum speed of the vehicle. Alternatively, the pressure value acting on the actuators may be reduced to a value below the first predetermined value of pressure the slower the vehicle is travelling when emergency braking is initiated.

What is claimed is:

1. A method for regulating the braking torque generated by a braking system in a vehicle capable of traveling at a range of speeds including a first predetermined speed, said braking system including a friction lining, a brake surface, and an actuator for displacing said friction lining by means of a medium towards said brake surface with a predetermined brake pressure including a maximum brake pressure for said range of speeds of said vehicle in order to generate said brake torque, said method comprising restricting said predetermined brake pressure to a restricted brake pressure below said maximum brake pressure only when said actuator is actuated when said vehicle is traveling at a speed below first predetermined speed.

2. The method of claim 1 wherein said medium comprises a pressurizable fluid medium, said restricting of said predetermined brake pressure comprising limiting the pressure in said pressurizable fluid medium to a first predetermined pressure when said actuator is actuated when said vehicle is traveling at a speed below said first predetermined speed.

3. The method of claim 1 wherein said first predetermined speed comprises 60 km/h.

4. The method of claim 3 wherein said first predetermined speed comprises 50 km/h.

5. The method of claim 4 wherein said first predetermined speed comprises 40 km/h.

6. The method of claim 1 wherein said first predetermined speed is in a range between about 10 and 40 km/h.

7. The method of claim 2 wherein said pressure in said pressurizable fluid medium comprises a predetermined maximum pressure when said actuator is actuated when said vehicle is traveling at a speed above said first predetermined speed, said predetermined maximum pressure being at least 10% greater than said first predetermined pressure.

8. The method of claim 7 wherein said pressure in said pressurizable fluid medium comprises a predetermined maximum pressure when said actuator is actuated when said vehicle is traveling at a speed above said first predetermined speed, said predetermined maximum pressure being at least 20% greater than said first predetermined pressure.

9. The method of claim 7 wherein said speed above said first predetermined speed comprises a second predetermined speed, said second predetermined speed being at least 10% higher than said first predetermined speed, said pressure in said pressurizable fluid medium being between said first predetermined pressure and said predetermined maximum pressure when said actuator is actuated when said vehicle is traveling at a speed greater than said first predetermined speed and less than said second predetermined speed.

10. The method of claim 9 wherein said second predetermined speed is between about 30% and 60% greater than said first predetermined speed.

11. The method of claim 9 wherein said first predetermined speed is between about 10 and 40 km/h and said second predetermined speed is between about 20 and 60 km/h.

12. The method of claim 1 wherein said brake surface is provided on a disk brake.

13. Apparatus for regulating the braking torque generated by a braking system in a vehicle capable of traveling at a range of speeds comprising a brake pedal, an actuator communicating with said brake pedal by means of a medium in response to depression of said brake pedal, a brake surface, a brake lining displaceable towards said brake surface by means of said actuator, whereby said brake lining acts on said brake surface with a predetermined brake pressure including a maximum brake pressure for said range of speeds of said vehicle to generate said brake torque, and an electronic processing unit including a stored first predetermined speed, said electronic processing unit comprising speed determining means for determining said speed when said brake pedal is initially depressed, comparison means for comparing said determined speed with said first predetermined speed, and pressure restriction means for restricting said brake pressure to a first predetermined brake pressure only when said speed is less than said first predetermined speed, said first predetermined pressure being less than said maximum brake pressure.

14. The apparatus of claim 13 wherein said medium comprises a fluid medium, and wherein said pressure restriction means comprises means for restricting said brake pressure in said fluid medium to said first predetermined brake pressure.

15. The apparatus of claim 13 wherein said electronic processing unit includes a stored second predetermined speed, and said comparison means compares said determined speed with said second predetermined speed, said second predetermined speed being greater than said first predetermined speed, and including pressure means for permitting said brake pressure in said fluid medium to comprise said maximum brake pressure when said determined speed exceeds said second predetermined speed.

* * * * *

UNITED STATES PATENT AND TRADEMARK OFFICE
CERTIFICATE OF CORRECTION

PATENT NO. : 6,375,281 B1
DATED : April 23, 2002
INVENTOR(S) : Dan Angerfors

It is certified that error appears in the above-identified patent and that said Letters Patent is hereby corrected as shown below:

<u>Title page,</u>
Item [57], ABSTRACT,
Line 4, "he" should read -- the --.

Delete the specification and substitute the attached specification.

Signed and Sealed this

Eighth Day of October, 2002

Attest:

Attesting Officer

JAMES E. ROGAN
*Director of the United States Patent and Trademark Office*

BRAKE TORQUE REGULATION FOR VEHICLES

FIELD OF THE INVENTION

The present invention relates to a method for regulating braking torque generated by a braking system in a wheeled vehicle. More particularly, the present invention relates to apparatus for regulating braking torque generated by a braking system in a wheeled vehicle. More particularly, the present invention relates to the use of pressure regulating means in a braking system of a wheeled vehicle to restrict brake torque generated by the braking system.

The present invention is primarily intended for, but not restricted solely to, applications in braking systems of commercial vehicles such as trucks and lorries.

BACKGROUND OF THE INVENTION

Electronic control systems are being employed to an ever increasing extent in vehicles in order to ensure the optimal efficiency and reliability of various operational systems. A recent development in the truck industry is the availability of electronic braking systems (EBS). Although compressed air is still used to apply the brakes in EBS, electronics are used to command pressure-regulating modules in order to pressurize the brake cylinders with compressed air to thereby engage the brakes. At least theoretically, by being able to monitor various forces, load changes and individual braking rates, EBS can continuously modify the braking on each wheel to thereby provide optimal distribution of the braking force. Anti-lock braking (ABS) and traction-control (ASR) functions can also be integrated in the EBS.

As is described in International Application No. WO 91/09758, EBS can be employed to adapt the brake pressure supplied to the brakes of a trailer to that supplied to the brakes of the hauling truck.

Irrespective of whether a truck is fitted with EBS, during an emergency stop the brake torque generated by the brakes rapidly rises to a short duration peak value before leveling off to a lower value. This effect is illustrated in Fig. 1 for a drum brake system in which the brake torque is plotted as a function of time for emergency braking from three different speeds. Thus, curve A represents emergency braking from 20 km/h, curve B from 60 km/h and curve C from 100 km/h. It is thus apparent that the maximum value of peak brake torque arises when emergency braking from relatively low speed.

The use of disk brakes on commercial vehicles is becoming more widespread. Generally, disk brakes are lighter than corresponding drum brakes, thereby contributing to reduced unsprung weight. Furthermore, they are able to dissipate heat more effectively than drum brakes, and they are therefore often less prone to brake fade from high speeds. In order to slow down a heavily laden truck from high speeds, the disk brake actuators must be capable of exerting high pressure on the brake pads.. As is apparent from Fig. 2, this high braking pressure results in even greater peak values for the brake torque than those attained with a drum brake system when emergency braking from corresponding speeds.

The high peak values of brake torque when emergency braking from low speed, as represented by curve D in Fig. 2, create significant problems for the truck manufacturer. Firstly, the vehicle suspension components and axles, particularly at the front of the vehicle, must be dimensioned to be able to withstand these peak braking torques. This implies a substantial increase in weight and manufacturing costs. Secondly, the peak braking torque may be sufficient to activate the ABS system even in the truck is travelling on a high-friction surface such as dry asphalt. On such surfaces and at speeds below about 25 km/h, a shorter braking distance is in fact attained if the ABS does not cut in. Thirdly, the severe jolt which is transmitted through the truck upon emergency application of the brakes at low speeds requires that the cargo has to be more securely tied down than would be the case if such peak brake torques did not arise. This, of course, requires extra time and expense in equipping the truck with adequate cargo-retaining means.

It is therefore an object of the present invention to provide a method and an apparatus for overcoming the problems associated with peak brake torque arising during emergency braking from low speeds.

SUMMARY OF THE INVENTION

In accordance with the present invention, this and other objects have now been realized by the invention of a method for regulating the braking torque generated by a braking system in a vehicle capable of traveling at a range of speeds including a first predetermined speed, the braking system including a friction lining, a brake surface, and an actuator for displacing the friction lining by means of a medium towards the brake surface with a predetermined brake pressure including a maximum brake pressure for the range of speeds of the vehicle in order to generate the brake torque, the method comprising restricting the predetermined brake pressure to a restricted brake pressure below the maximum brake pressure only when the actuator is actuated when the vehicle is traveling at a speed below the first predetermined speed. In a preferred embodiment, the medium comprises a pressurizable fluid medium, the restricting of the predetermined brake pressure comprising limiting the pressure in the pressurizable fluid medium to a first predetermined pressure when the actuator is actuated when the vehicle is traveling at a speed below the first predetermined speed.

In accordance with one embodiment of the method of the present invention, the first predetermined speed is about 60 km/h, preferably about 50 km/h, and more preferably about 40 km/h, and in another embodiment between about 10 and 40 km/h.

In accordance with another embodiment of the method of the present invention, the pressure in the pressurizable fluid medium comprises a predetermined maximum pressure when the actuator is actuated when the vehicle is traveling at a speed above the first predetermined speed, the predetermined maximum pressure being at least 10% greater than the first predetermined pressure, and in a more preferred embodiment, being at least 20% greater than the first predetermined pressure. In accordance with a preferred embodiment, the speed above the first predetermined speed comprises a second predetermined speed, the second predetermined speed being at least 10% higher than the first predetermined speed, the pressure in the pressurizable fluid medium being between the first predetermined pressure and the predetermined maximum pressure when the actuator is actuated when the vehicle is traveling at a speed greater than the first predetermined speed and less than the second predetermined speed. In accordance with a preferred embodiment, the second predetermined speed is between about 30% and 60% greater than the first predetermined speed. In accordance with one embodiment, the first predetermined speed is between about 10 and 40 km/h and the second predetermined speed is between about 20 and 60 km/h.

In accordance with another embodiment of the method of the present invention, the brake surface is provided on a disk brake.

In accordance with the present invention, apparatus has also been provided for regulating the braking torque generated by a braking system in a vehicle capable of traveling at a range of speeds comprising a brake pedal, an actuator communicating with the brake pedal by means of a medium in response to depression of the brake pedal, a brake surface, a brake lining displaceable towards the brake surface by means of the actuator, whereby the brake lining acts on the brake surface with a predetermined brake pressure including a maximum brake pressure for the range of speeds of the vehicle to generate the brake torque, and an electronic processing unit including a stored first predetermined speed, the electronic processing unit comprising speed determining means for determining the speed when the brake pedal is initially depressed, comparison means for comparing the determined speed with the first predetermined speed, and pressure restriction means for restricting the brake pressure to a first predetermined brake pressure only when the speed is less than the first predetermined speed, the first predetermined pressure being less than the maximum brake pressure. In accordance with a preferred embodiment, the medium comprises a fluid medium, and wherein the pressure restriction means comprises means for restricting the brake pressure in the fluid medium to the first predetermined brake pressure.

In accordance with another embodiment of the apparatus of the present invention, the electronic processing unit includes a stored second predetermined speed, and the comparison means compares the determined speed with the second predetermined speed, the second predetermined speed being greater than the first predetermined speed, and including pressure means for permitting the brake pressure in the fluid medium to comprise the maximum brake pressure when the determined speed exceeds the second predetermined speed.

The present invention further provides for the use of pressure regulating means in a braking system of a wheeled vehicle to restrict brake torque generated by the braking system to a predetermined value below a maximum value when the vehicle is travelling below a predetermined speed when the braking system is initially actuated.

In accordance with the present invention, when emergency braking from a speed below a predetermined value, braking pressure is restricted to a predetermined value which lies below the maximum value of pressure which is otherwise attainable above the predetermined value of speed. In this manner, the peak brake torque value when emergency braking from low speeds will be relatively lower without compromising desirable high braking pressure when emergency braking from higher speeds. Therefore, even more effective brakes can be fitted to a vehicle without having to strengthen existing suspension components and mountings.

BRIEF DESCRIPTION OF THE DRAWINGS

Further objects and advantages of the present invention will become apparent from the subsequent detailed description of preferred embodiments in which reference is made to the attached drawings, of which:

Fig. 1 is a graphical representation of the relationship between brake torque and time for a vehicle fitted with a conventional drum brake system emergency braked from various speeds;

Fig. 2 is a graphical representation corresponding to Fig. 1, though for a vehicle fitted with a conventional disk brake system;

Fig. 3 is a schematic representation of a vehicle brake system provided with apparatus according to the present invention; and Fig. 4 is a graphical representation of the relationship between pressure and speed in a brake system operated according to a preferred embodiment of the present invention.

DETAILED DESCRIPTION

As is mentioned above, Fig. 1 is a graph of brake torque against time for emergency braking from three different speeds for a typical drum brake system fitted to a commercial vehicle. By the expression "emergency braking" it is meant that the driver of the vehicle attempts to reduce the speed of the vehicle as quickly as possible. Curve A represents emergency braking from 20 km/h, curve B from 60 km/h and curve C from 100 km/h. In all cases, when the brakes are initially applied, a peak braking torque is attained for a short duration of time. This peak is most noticeable when emergency braking from low speed.

In a similar manner, Fig. 2 shows corresponding curves D, E and F for a commercial vehicle fitted with a disk brake system. As is clearly illustrated by curve D, the peak value of the braking torque when emergency braking from low speed is significantly increased when compared to both braking from higher speeds and the peak torque which is attained with the drum brake system.

Curve G, illustrated by a dashed line in Fig. 2, represents a limited peak brake torque value which is attainable in accordance with the method and apparatus of the present invention. It is to be noted that reduction of the peak brake torque value affects only the braking curve from low speed. The brake torque values are not affected for emergency braking from higher speeds. Nevertheless, due to the inherent flexibility of the present system, because of its compatibility with EBS, the manufacturer and/or workshop can easily reprogram the system so that peak brake torque can be restricted during emergency braking from above any chosen speed.

Fig. 3 schematically illustrates a braking system, generally denoted by reference numeral 10, of the EBS type incorporating apparatus according to the present invention, which permits generation of the curve G of

-7-

Fig. 2. The preferred embodiment of Fig. 3 is a compressed air braking system, with compressed air conduits being depicted by thicker lines and electrical leads being depicted by thinner lines. It is to be understood, however, that the present invention can be practiced on a braking system having an operating medium other than compressed air, for example a hydraulic system.

The system 10 of Fig. 3 comprises a brake pedal 12 connected to a brake valve 14. In a manner which will be explained below, depression of the brake pedal 12 causes an actuator 16 associated with each wheel of the vehicle (four in the shown embodiment) to effect displacement of a friction lining 18 towards a brake surface 20 which, in the present case, is on a brake disk 22.

Compressed air for the braking system 10 is stored in rechargeable reservoirs 24, 26, and 28. One reservoir 24 supplies compressed air to the rear brakes of the vehicle, while another reservoir 26 supplies compressed air to the front brakes. In a typical brake system, the pressure of the compressed air in the reservoirs, 24 and 26, is between 8.2 and 12 bar. Should the pressure drop below 8.2 bar, a compressor (not shown) cuts in to recharge the reservoirs. The third reservoir 28 supplies compressed air at a pressure of between 8.2 and 8.5 bar to a parking brake. The three reservoirs also supply compressed air to a trailer modulator valve 29 to which air lines to a trailer (not shown) may be connected to thereby permit braking of the trailer. A drainage tank 30 may be included in the braking system for the collection of water from the compressed air.

The respective reservoirs, 24 and 26, supply compressed air to a pressure modulator 32 associated with each wheel. In this embodiment, the rear wheels are served by a tandem pressure modulator. In a manner which will be described below, each pressure modulator 32 is controlled by signals sent from a central electronic processing unit (CPU) 34 to thereby regulate the supply of compressed air to its respective actuator 16.

The CPU receives signals from a number of sensors and, dependent on the information content of such signals, instructs each pressure modulator 32 to supply a particular pressure of compressed air to its respective actuator 16. Accordingly, the brake valve 14 is provided with a sensor 36 to detect displacement of the brake pedal 12 which is an indication of the degree of braking effort which is desired by the driver. In the shown embodiment, the vehicle is provided with rear air suspension 38. Thus, pressure sensors 40 relay information to the CPU 34 so that an indication of the load on the rear suspension can be obtained. The system further includes at each wheel a wheel speed sensor 42 and a friction lining wear sensor 44. The information relayed by these sensors is used, *inter alia*, to modulate the ABS function of the braking system.

By taking into account e.g. the rear axle load, the speed of rotation of each wheel, the degree of wear of each friction lining and the degree of braking effort which is desired by the driver, the CPU can apportion pressure between the actuators 16 so that the most advantageous braking effect is attained.

In accordance with the present invention, the CPU is provided with means in the form of a comparator for comparing the speed at which the vehicle is travelling when, in the event of an emergency braking, the brake pedal 12 is initially depressed to a predetermined speed value stored in a memory of the CPU. If the comparator determines that the vehicle speed is less than the predetermined speed value, the CPU signals the pressure modulators 32 to restrict the pressure to the actuators 16 to a first predetermined value of

-9- pressure which is below the normal maximum value. Since the pressure to the actuators is restricted, the braking pressure with which the friction linings 18 act on the brake surfaces 20 will be correspondingly lower than the otherwise attainable maximum value. As a consequence, the peak braking torque will be lower than that which would otherwise have been attained if the CPU had not instructed the pressure modulators 32 to restrict the pressure.

Conversely, should the comparator determine that the vehicle speed is higher than the predetermined speed value stored in the CPU, the CPU will permit the pressure modulators 32 to allow maximum pressure to be transmitted to the actuators 16. Thus, above the predetermined speed value, the actuators 16 are able to cause the friction linings 18 to exert a maximum braking pressure on the braking surfaces 20.

With reference to Fig. 2, if the predetermined speed value stored in the CPU is chosen to be, for example, 40 km/h, emergency braking from 20 km/h will generate a brake torque/time curve corresponding to curve G. In other words, the peak brake torque will be significantly lower than if the CPU had not caused the pressure modulators to restrict the pressure to the first predetermined value of pressure. In the event of emergency braking from 60 km/h and 100 km/h, curves corresponding to curves E and F respectively will be obtained.

The actual value of the predetermined speed value is not critical. Preferably, it should be below about 60 km/h so that braking performance above this speed is not compromised. Advantageously, the predetermined speed value can be below about 50 km/h and most preferably, at about 40 km/h.

Similarly, the actual degree of restriction of the pressure of the compressed air acting on the actuators is not critical. Nevertheless, it is advantageous if the maximum attainable pressure is at least 10% greater, preferably at least 20% greater, than the first predetermined value of pressure.

In a preferred embodiment of the present invention, a second predetermined speed value is stored in the CPU, the second predetermined speed value being at least 10% higher than the first predetermined speed value. Thus, the pressure of the compressed air acting on the actuators is limited to a first predetermined value of pressure in the event of emergency braking when the vehicle is travelling at a speed below the first predetermined speed value and is permitted to be a maximum value when the vehicle is subjected to emergency braking from a speed above the second predetermined speed value. Should the vehicle be travelling at a speed between the first predetermined speed value and the second predetermined speed value when emergency braking is instigated, the pressure modulators 32 are instructed to provide pressure to the actuators 16 at a pressure value which lies between the first predetermined value of pressure and the maximum pressure. This situation is illustrated in Fig. 4 in which the first predetermined speed value is denoted by $v_1$ and the second predetermined speed value by $v_2$.

In a preferred embodiment of the present invention, the second predetermined speed value $v_2$ is between about 30% and 60% higher than the first predetermined speed value $v_1$. Advantageously, the first predetermined value of speed $v_1$ lies between about 10 km/h and 40 km/h and the second predetermined value of speed $v_2$ lies between about 20 km/h and about 60 km/h. The first predetermined value of pressure $P_1$ may typically be about 7.5 bar and the maximum pressure $P_M$ about 9 bar +/- 0.5 bar. In the event of a fault in the arrangement according to the present invention, and to

-11- prevent possible damage being inflicted on the vehicle due to excessively high peak brake torques, the brake system may be designed to operate at the first predetermined value of pressure throughout the entire speed range of the vehicle. Naturally, the vehicle driver can be informed of the fault by means of a warning signal in the vehicle cab. It is to be appreciated that the vehicle is capable of meeting legislated braking distances even if the brake system is operated at the first predetermined value of pressure throughout the entire speed range of the vehicle.

It will be apparent from Fig. 4 that the value of pressure between the first predetermined value of pressure $P_1$ and maximum pressure $P_M$ varies in a substantially linear manner. It is to be understood, however, that the present invention may also make use of a non-linear pressure variation between $P_1$ and $P_M$.

The present invention is not restricted to the embodiments described above and shown in the drawings, but may be varied within the scope of the appended claims. For example, the second predetermined speed value may correspond to the maximum speed of the vehicle such that the pressure value acting on the actuators increases gradually from the first predetermined value of pressure below the first predetermined speed value to maximum pressure at the maximum speed of the vehicle. Alternatively, the pressure value acting on the actuators may be reduced to a value below the first predetermined value of pressure the slower the vehicle is traveling when emergency braking is initiated.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

255940_1.DOC

UNITED STATES PATENT AND TRADEMARK OFFICE
CERTIFICATE OF CORRECTION

PATENT NO. : 6,375,281 B1
APPLICATION NO. : 09/530285
DATED : April 23, 2002
INVENTOR(S) : Dan Angerfors It is certified that error appears in the above-identified patent and that said Letters Patent is hereby corrected as shown below:

<u>Title page,</u>
Item [57], ABSTRACT,
Line 4, "he" should read -- the --.

Delete the specification and substitute the attached specification.

This certificate supersedes Certificate of Correction issued October 8, 2002.

Signed and Sealed this

Twenty-seventh Day of November, 2007

JON W. DUDAS
*Director of the United States Patent and Trademark Office*

BRAKE TORQUE REGULATION FOR VEHICLES

FIELD OF THE INVENTION

The present invention relates to a method for regulating braking torque generated by a braking system in a wheeled vehicle. More particularly, the present invention relates to apparatus for regulating braking torque generated by a braking system in a wheeled vehicle. More particularly, the present invention relates to the use of pressure regulating means in a braking system of a wheeled vehicle to restrict brake torque generated by the braking system.

The present invention is primarily intended for, but not restricted solely to, applications in braking systems of commercial vehicles such as trucks and lorries.

BACKGROUND OF THE INVENTION

Electronic control systems are being employed to an ever increasing extent in vehicles in order to ensure the optimal efficiency and reliability of various operational systems. A recent development in the truck industry is the availability of electronic braking systems (EBS). Although compressed air is still used to apply the brakes in EBS, electronics are used to command pressure-regulating modules in order to pressurize the brake cylinders with compressed air to thereby engage the brakes. At least theoretically, by being able to monitor various forces, load changes and individual braking rates, EBS can continuously modify the braking on each wheel to thereby provide optimal distribution of the braking force. Anti-lock braking (ABS) and traction-control (ASR) functions can also be integrated in the EBS.

As is described in International Application No. WO 91/09758, EBS can be employed to adapt the brake pressure supplied to the brakes of a trailer to that supplied to the brakes of the hauling truck.

Irrespective of whether a truck is fitted with EBS, during an emergency stop the brake torque generated by the brakes rapidly rises to a short duration peak value before leveling off to a lower value. This effect is illustrated in FIG. 1 for a drum brake system in which the brake torque is plotted as a function of time for emergency braking from three different speeds. Thus, curve A represents emergency braking from 20 km/h, curve B from 60 km/h and curve C from 100 km/h. It is thus apparent that the maximum value of peak brake torque arises when emergency braking from relatively low speed.

The use of disk brakes on commercial vehicles is becoming more widespread. Generally, disk brakes are lighter than corresponding drum brakes, thereby contributing to reduced unsprung weight. Furthermore, they are able to dissipate heat more effectively than drum brakes, and they are therefore often less prone to brake fade from high speeds. In order to slow down a heavily laden truck from high speeds, the disk brake actuators must be capable of exerting high pressure on the brake pads. As is apparent from FIG. 2, this high braking pressure results in even greater peak values for the brake torque than those attained with a drum brake system when emergency braking from corresponding speeds.

The high peak values of brake torque when emergency braking from low speed, as represented by curve D in FIG. 2, create significant problems for the truck manufacturer. Firstly, the vehicle suspension components and axles, particularly at the front of the vehicle, must be dimensioned to be able to withstand these peak braking torques. This implies a substantial increase in weight and manufacturing costs. Secondly, the peak braking torque may be sufficient to activate the ABS system even if the truck is travelling on a high-friction surface such as dry asphalt. On such surfaces and at speeds below about 25 km/h, a shorter braking distance is in fact attained if the ABS does not cut in. Thirdly, the severe jolt which is transmitted through the truck upon emergency application of the brakes at low speeds requires that the cargo has to be more securely tied down than would be the case if such peak brake torques did not arise. This, of course, requires extra time and expense in equipping the truck with adequate cargo-retaining means.

It is therefore an object of the present invention to provide a method and an apparatus for overcoming the problems associated with peak brake torque arising during emergency braking from low speeds.

SUMMARY OF THE INVENTION

In accordance with the present invention, this and other objects have now been realized by the invention of a method for regulating the braking torque generated by a braking system in a vehicle capable of traveling at a range of speeds including a first predetermined speed, the braking system including a friction lining, a brake surface, and an actuator for displacing the friction lining by means of a medium towards the brake surface with a predetermined brake pressure including a maximum brake pressure for the range of speeds of the vehicle in order to generate the brake torque, the method comprising restricting the predetermined brake pressure to a restricted brake pressure below the maximum brake pressure only when the actuator is actuated when the vehicle is traveling at a speed below the first predetermined speed. In a preferred embodiment, the medium comprises a pressurizable fluid medium, the restricting of the predetermined brake pressure comprising limiting the pressure in the pressurizable fluid medium to a first predetermined pressure when the actuator is actuated when the vehicle is traveling at a speed below the first predetermined speed.

In accordance with one embodiment of the method of the present invention, the first predetermined speed is about 60 km/h, preferably about 50 km/h, and more preferably about 40 km/h, and in another embodiment between about 10 and 40 km/h.

In accordance with another embodiment of the method of the present invention, the pressure in the pressurizable fluid medium comprises a predetermined maximum pressure when the actuator is actuated when the vehicle is traveling at a speed above the first predetermined speed, the predetermined maximum pressure being at least 10% greater than the first predetermined pressure, and in a more preferred embodiment, being at least 20% greater than the first predetermined pressure. In accordance with a preferred embodiment, the speed above the first predetermined speed comprises a second predetermined speed, the second predetermined speed being at least 10% higher than the first predetermined speed, the pressure in the pressurizable fluid medium being between the first predetermined pressure and the predetermined maximum pressure when the actuator is actuated when the vehicle is traveling at a speed greater than the first predetermined speed and less than the second predetermined speed. In accordance with a preferred embodiment, the second predetermined speed is between about 30% and 60% greater than the first predetermined speed. In accordance with one embodiment, the first predetermined speed is between about 10 and 40 km/h and the second predetermined speed is between about 20 and 60 km/h.

In accordance with another embodiment of the method of the present invention, the brake surface is provided on a disk brake.

In accordance with the present invention, apparatus has also been provided for regulating the braking torque generated by a braking system in a vehicle capable of traveling at a range of speeds comprising a brake pedal, an actuator communicating with the brake pedal by means of a medium in response to depression of the brake pedal, a brake surface, a brake lining displaceable towards the brake surface by means of the actuator, whereby the brake lining acts on the brake surface with a predetermined brake pressure including a maximum brake pressure for the range of speeds of the vehicle to generate the brake torque, and an electronic processing unit including a stored first predetermined speed, the electronic processing unit comprising speed determining means for determining the speed when the brake pedal is initially depressed, comparison means for comparing the determined speed with the first predetermined speed, and pressure restriction means for restricting the brake pressure to a first predetermined brake pressure only when the speed is less than the first predetermined speed, the first predetermined pressure being less than the maximum brake pressure. In accordance with a preferred embodiment, the medium comprises a fluid medium, and wherein the pressure restriction means comprises means for restricting the brake pressure in the fluid medium to the first predetermined brake pressure.

In accordance with another embodiment of the apparatus of the present invention, the electronic processing unit includes a stored second predetermined speed, and the comparison means compares the determined speed with the second predetermined speed, the second predetermined speed being greater than the first predetermined speed, and including pressure means for permitting the brake pressure in the fluid medium to comprise the maximum brake pressure when the determined speed exceeds the second predetermined speed.

The present invention further provides for the use of pressure regulating means in a braking system of a wheeled vehicle to restrict brake torque generated by the braking system to a predetermined value below a maximum value when the vehicle is travelling below a predetermined speed when the braking system is initially actuated.

In accordance with the present invention, when emergency braking from a speed below a predetermined value, braking pressure is restricted to a predetermined value which lies below the maximum value of pressure which is otherwise attainable above the predetermined value of speed. In this manner, the peak brake torque value when emergency braking from low speeds will be relatively lower without compromising desirable high braking pressure when emergency braking from higher speeds. Therefore, even more effective brakes can be fitted to a vehicle without having to strengthen existing suspension components and mountings.

BRIEF DESCRIPTION OF THE DRAWINGS

Further objects and advantages of the present invention will become apparent from the subsequent detailed description of preferred embodiments in which reference is made to the attached drawings, of which:

FIG. 1 is a graphical representation of the relationship between brake torque and time for a vehicle fitted with a conventional drum brake system emergency braked from various speeds;

FIG. 2 is a graphical representation corresponding to FIG. 1, though for a vehicle fitted with a conventional disk brake system;

FIG. 3 is a schematic representation of a vehicle brake system provided with apparatus according to the present invention; and FIG. 4 is a graphical representation of the relationship between pressure and speed in a brake system operated according to a preferred embodiment of the present invention.

DETAILED DESCRIPTION

As is mentioned above, FIG. 1 is a graph of brake torque against time for emergency braking from three different speeds for a typical drum brake system fitted to a commercial vehicle. By the expression "emergency braking" it is meant that the driver of the vehicle attempts to reduce the speed of the vehicle as quickly as possible. Curve A represents emergency braking from 20 km/h, curve B from 60 km/h and curve C from 100 km/h. In all cases, when the brakes are initially applied, a peak braking torque is attained for a short duration of time. This peak is most noticeable when emergency braking from low speed.

In a similar manner, FIG. 2 shows corresponding curves D, E and F for a commercial vehicle fitted with a disk brake system. As is clearly illustrated by curve D, the peak value of the braking torque when emergency braking from low speed is significantly increased when compared to both braking from higher speeds and the peak torque which is attained with the drum brake system.

Curve G, illustrated by a dashed line in FIG. 2, represents a limited peak brake torque value which is attainable in accordance with the method and apparatus of the present invention. It is to be noted that reduction of the peak brake torque value affects only the braking curve from low speed. The brake torque values are not affected for emergency braking from higher speeds. Nevertheless, due to the inherent flexibility of the present system, because of its compatibility with EBS, the manufacturer and/or workshop can easily reprogram the system so that peak brake torque can be restricted during emergency braking from above any chosen speed.

FIG. 3 schematically illustrates a braking system, generally denoted by reference numeral 10, of the EBS type incorporating apparatus according to the present invention, which permits generation of the curve G of FIG. 2. The preferred embodiment of FIG. 3 is a compressed air braking system, with compressed air conduits being depicted by thicker lines and electrical leads being depicted by thinner lines. It is to be understood, however, that the present invention can be practiced on a braking system having an operating medium other than compressed air, for example a hydraulic system.

The system 10 of FIG. 3 comprises a brake pedal 12 connected to a brake valve 14. In a manner which will be explained below, depression of the brake pedal 12 causes an actuator 16 associated with each wheel of the vehicle (four in the shown embodiment) to effect displacement of a friction lining 18 towards a brake surface 20 which, in the present case, is on a brake disk 22.

Compressed air for the braking system 10 is stored in rechargeable reservoirs 24, 26, and 28. One reservoir 24 supplies compressed air to the rear brakes of the vehicle, while another reservoir 26 supplies compressed air to the front brakes. In a typical brake system, the pressure of the compressed air in the reservoirs, 24 and 26, is between 8.2 and 12 bar. Should the pressure drop below 8.2 bar, a compressor (not shown) cuts in to recharge the reservoirs.

The third reservoir 28 supplies compressed air at a pressure of between 8.2 and 8.5 bar to a parking brake. The three reservoirs also supply compressed air to a trailer modulator valve 29 to which air lines to a trailer (not shown) may be connected to thereby permit braking of the trailer. A drainage tank 30 may be included in the braking system for the collection of water from the compressed air.

The respective reservoirs, 24 and 26, supply compressed air to a pressure modulator 32 associated with each wheel. In this embodiment, the rear wheels are served by a tandem pressure modulator. In a manner which will be described below, each pressure modulator 32 is controlled by signals sent from a central electronic processing unit (CPU) 34 to thereby regulate the supply of compressed air to its respective actuator 16.

The CPU receives signals from a number of sensors and, dependent on the information content of such signals, instructs each pressure modulator 32 to supply a particular pressure of compressed air to its respective actuator 16. Accordingly, the brake valve 14 is provided with a sensor 36 to detect displacement of the brake pedal 12 which is an indication of the degree of braking effort which is desired by the driver. In the shown embodiment, the vehicle is provided with rear air suspension 38. Thus, pressure sensors 40 relay information to the CPU 34 so that an indication of the load on the rear suspension can be obtained. The system further includes at each wheel a wheel speed sensor 42 and a friction lining wear sensor 44. The information relayed by these sensors is used, inter alia, to modulate the ABS function of the braking system.

By taking into account e.g. the rear axle load, the speed of rotation of each wheel, the degree of wear of each friction lining and the degree of braking effort which is desired by the driver, the CPU can apportion pressure between the actuators 16 so that the most advantageous braking effect is attained.

In accordance with the present invention, the CPU is provided with means in the form of a comparator for comparing the speed at which the vehicle is travelling when, in the event of an emergency braking, the brake pedal 12 is initially depressed to a predetermined speed value stored in a memory of the CPU. If the comparator determines that the vehicle speed is less than the predetermined speed value, the CPU signals the pressure modulators 32 to restrict the pressure to the actuators 16 to a first predetermined value of pressure which is below the normal maximum value. Since the pressure to the actuators is restricted, the braking pressure with which the friction linings 18 act on the brake surfaces 20 will be correspondingly lower than the otherwise attainable maximum value. As a consequence, the peak braking torque will be lower than that which would otherwise have been attained if the CPU had not instructed the pressure modulators 32 to restrict the pressure.

Conversely, should the comparator determine that the vehicle speed is higher than the predetermined speed value stored in the CPU, the CPU will permit the pressure modulators 32 to allow maximum pressure to be transmitted to the actuators 16. Thus, above the predetermined speed value, the actuators 16 are able to cause the friction linings 18 to exert a maximum braking pressure on the braking surfaces 20.

With reference to FIG. 2, if the predetermined speed value stored in the CPU is chosen to be, for example, 40 km/h, emergency braking from 20 km/h will generate a brake torque/time curve corresponding to curve G. In other words, the peak brake torque will be significantly lower than if the CPU had not caused the pressure modulators to restrict the pressure to the first predetermined value of pressure. In the event of emergency braking from 60 km/h and 100 km/h, curves corresponding to curves E and F respectively will be obtained.

The actual value of the predetermined speed value is not critical. Preferably, it should be below about 60 km/h so that braking performance above this speed is not compromised. Advantageously, the predetermined speed value can be below about 50 km/h and most preferably, at about 40 km/h.

Similarly, the actual degree of restriction of the pressure of the compressed air acting on the actuators is not critical. Nevertheless, it is advantageous if the maximum attainable pressure is at least 10% greater, preferably at least 20% greater, than the first predetermined value of pressure.

In a preferred embodiment of the present invention, a second predetermined speed value is stored in the CPU, the second predetermined speed value being at least 10% higher than the first predetermined speed value. Thus, the pressure of the compressed air acting on the actuators is limited to a first predetermined value of pressure in the event of emergency braking when the vehicle is travelling at a speed below the first predetermined speed value and is permitted to be a maximum value when the vehicle is subjected to emergency braking from a speed above the second predetermined speed value. Should the vehicle be travelling at a speed between the first predetermined speed value and the second predetermined speed value when emergency braking is instigated, the pressure modulators 32 are instructed to provide pressure to the actuators 16 at a pressure value which lies between the first predetermined value of pressure and the maximum pressure. This situation is illustrated in FIG. 4 in which the first predetermined speed value is denoted by $v_1$ and the second predetermined speed value by $v_2$.

In a preferred embodiment of the present invention, the second predetermined speed value $v_2$ is between about 30% and 60% higher than the first predetermined speed value $v_1$. Advantageously, the first predetermined value of speed $v_1$ lies between about 10 km/h and 40 km/h and the second predetermined value of speed $v_2$ lies between about 20 km/h and about 60 km/h. The first predetermined value of pressure $P_1$ may typically be about 7.5 bar and the maximum pressure $P_M$ about 9 bar+/−0.5 bar. In the event of a fault in the arrangement according to the present invention, and to prevent possible damage being inflicted on the vehicle due to excessively high peak brake torques, the brake system may be designed to operate at the first predetermined value of pressure throughout the entire speed range of the vehicle. Naturally, the vehicle driver can be informed of the fault by means of a warning signal in the vehicle cab. It is to be appreciated that the vehicle is capable of meeting legislated braking distances even if the brake system is operated at the first predetermined value of pressure throughout the entire speed range of the vehicle.

It will be apparent from FIG. 4 that the value of pressure between the first predetermined value of pressure $P_1$ and maximum pressure $P_M$ varies in a substantially linear manner. It is to be understood, however, that the present invention may also make use of a non-linear pressure variation between $P_1$ and $P_M$.

The present invention is not restricted to the embodiments described above and shown in the drawings, but may be varied within the scope of the appended claims. For example, the second predetermined speed value may correspond to the maximum speed of the vehicle such that the pressure value acting on the actuators increases gradually from the first predetermined value of pressure below the first predetermined speed value to maximum pressure at the maximum speed of the vehicle. Alternatively, the pressure value acting on the actuators may be reduced to a value below the first predetermined value of pressure the slower the vehicle is traveling when emergency braking is initiated.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method for regulating the braking torque generated by a braking system in a vehicle capable of traveling at a range of speeds including a first predetermined speed, said braking system including a friction lining, a brake surface, and an actuator for displacing said friction lining by means of a medium towards said brake surface with a predetermined brake pressure including a maximum brake pressure for said range of speeds of said vehicle in order to generate said brake torque, said method comprising restricting said predetermined brake pressure to a restricted brake pressure below said maximum brake pressure only when said actuator is actuated when said vehicle is traveling at a speed below said first predetermined speed.

2. The method of claim 1 wherein said medium comprises a pressurizable fluid medium, said restricting of said predetermined brake pressure comprising limiting the pressure in said pressurizable fluid medium to a first predetermined pressure when said actuator is actuated when said vehicle is traveling at a speed below said first predetermined speed.

3. The method of claim 1 wherein said first predetermined speed comprises 60 km/h.

4. The method of claim 3 wherein said first predetermined speed comprises 50 km/h.

5. The method of claim 4 wherein said first predetermined speed comprises 40 km/h.

6. The method of claim 1 wherein said first predetermined speed is in a range between about 10 and 40 km/h.

7. The method of claim 2 wherein said pressure in said pressurizable fluid medium comprises a predetermined maximum pressure when said actuator is actuated when said vehicle is traveling at a speed above said first predetermined speed, said predetermined maximum pressure being at least 10% greater than said first predetermined pressure.

8. The method of claim 7 wherein said pressure in said pressurizable fluid medium comprises a predetermined maximum pressure when said actuator is actuated when said vehicle is traveling at a speed above said first predetermined speed, said predetermined maximum pressure being at least 20% greater than said first predetermined pressure.

9. The method of claim 7 wherein said speed above said first predetermined speed comprises a second predetermined speed, said second predetermined speed being at least 10% higher than said first predetermined speed, said pressure in said pressurizable fluid medium being between said first predetermined pressure and said predetermined maximum pressure when said actuator is actuated when said vehicle is traveling at a speed greater than said first predetermined speed and less than said second predetermined speed.

10. The method of claim 9 wherein said second predetermined speed is between about 30% and 60% greater than said first predetermined speed.

11. The method of claim 9 wherein said first predetermined speed is between about 10 and 40 km/h and said second predetermined speed is between about 20 and 60 km/h.

12. The method of claim 1 wherein said brake surface is provided on a disk brake.

13. Apparatus for regulating the braking torque generated by a braking system in a vehicle capable of traveling at a range of speeds comprising a brake pedal, an actuator communicating with said brake pedal by means of a medium in response to depression of said brake pedal, a brake surface, a brake lining displaceable towards said brake surface by means of said actuator, whereby said brake lining acts on said brake surface with a predetermined brake pressure including a maximum brake pressure for said range of speeds of said vehicle to generate said brake torque, and an electronic processing unit including a stored first predetermined speed, said electronic processing unit comprising speed determining means for determining said speed when said brake pedal is initially depressed, comparison means for comparing said determined speed with said first predetermined speed, and pressure restriction means for restricting said brake pressure to a first predetermined brake pressure only when said speed is less than said first predetermined speed, said first predetermined pressure being less than said maximum brake pressure.

14. The apparatus of claim 13 wherein said medium comprises a fluid medium, and wherein said pressure restriction means comprises means for restricting said brake pressure in said fluid medium to said first predetermined brake pressure.

15. The apparatus of claim 13 wherein said electronic processing unit includes a stored second predetermined speed, and said comparison means compares said determined speed with said second predetermined speed, said second predetermined speed being greater than said first predetermined speed, and including pressure means for permitting said brake pressure in said fluid medium to comprise said maximum brake pressure when said determined speed exceeds said second predetermined speed.

* * * * *